US005212859A

United States Patent [19]

Hagerty

[11] Patent Number: 5,212,859

[45] Date of Patent: May 25, 1993

[54] REMOVAL TOOL FOR SNAP RINGS AND THE LIKE

[76] Inventor: Willian K. Hagerty, 605 E. Norwood Pl., Alhambra, Calif. 91801

[21] Appl. No.: 919,059

[22] Filed: Jul. 23, 1992

[51] Int. Cl.[5] .............................................. B23P 19/04

[52] U.S. Cl. ........................................ 29/229; 29/225; 81/302; 81/486

[58] Field of Search .............. 81/186, 302, 418, 424.5, 81/485, 486; 29/225, 229, 268

[56] References Cited

U.S. PATENT DOCUMENTS

| | | | |
|---|---|---|---|
| 462,421 | 11/1918 | Wever . | |
| 1,008,176 | 11/1911 | Menzel | 81/418 |
| 1,071,934 | 9/1913 | MacKinnon . | |
| 1,093,400 | 4/1914 | Gottfrid | 81/418 |
| 1,119,374 | 12/1914 | Stirk . | |
| 1,153,674 | 9/1915 | Campbell | 81/302 |
| 1,157,082 | 10/1915 | Campbell . | |
| 1,264,304 | 4/1918 | Keech . | |
| 1,303,458 | 5/1919 | Bretz, Jr. . | |
| 1,324,557 | 12/1919 | Landaw . | |
| 1,475,665 | 11/1923 | Wakefield . | |
| 1,477,677 | 12/1923 | Westman . | |
| 1,477,786 | 12/1923 | Tillier . | |
| 1,557,370 | 10/1925 | Lane | 81/302 |
| 1,589,392 | 6/1926 | Hiatt . | |
| 1,681,662 | 8/1928 | Douglass | 81/302 |
| 2,489,905 | 11/1949 | Kuert . | |
| 2,573,942 | 11/1951 | Wolfson et al. . | |
| 2,595,989 | 5/1952 | Smeltz | 81/302 |
| 2,630,729 | 3/1953 | Arner | 81/418 |
| 3,254,649 | 6/1966 | Wood | 81/302 |
| 3,937,005 | 2/1976 | Becker | 81/485 |
| 4,790,056 | 12/1988 | Anderson . | |
| 4,831,905 | 5/1989 | Murchison . | |

*Primary Examiner*—James G. Smith

*Attorney, Agent, or Firm*—Harold L. Jackson

[57] ABSTRACT

A pliers for removing and manipulating a snap ring and like ring devices, wherein the pliers is defined by handles pivotally connected to each other. The handles comprise a pair of integrally formed jaw members that are provided with a positive engaging socket member formed on each of the respective free end portions of the jaw members. The socket members include a convergent socket arranged to lockingly receive the respective open free ends of the snap ring. A pivoting member is positioned intermediate the handles and jaw members with a biasing spring mounted between the oppositely disposed jaw members forwardly of the pivot member, whereby the jaw members are biased in an open position so as to forcibly engage each of the socket members with the respective open ends of the snap ring, thereby preventing the snap ring from being inadvertently removed or disengaged from the convergent sockets.

30 Claims, 2 Drawing Sheets

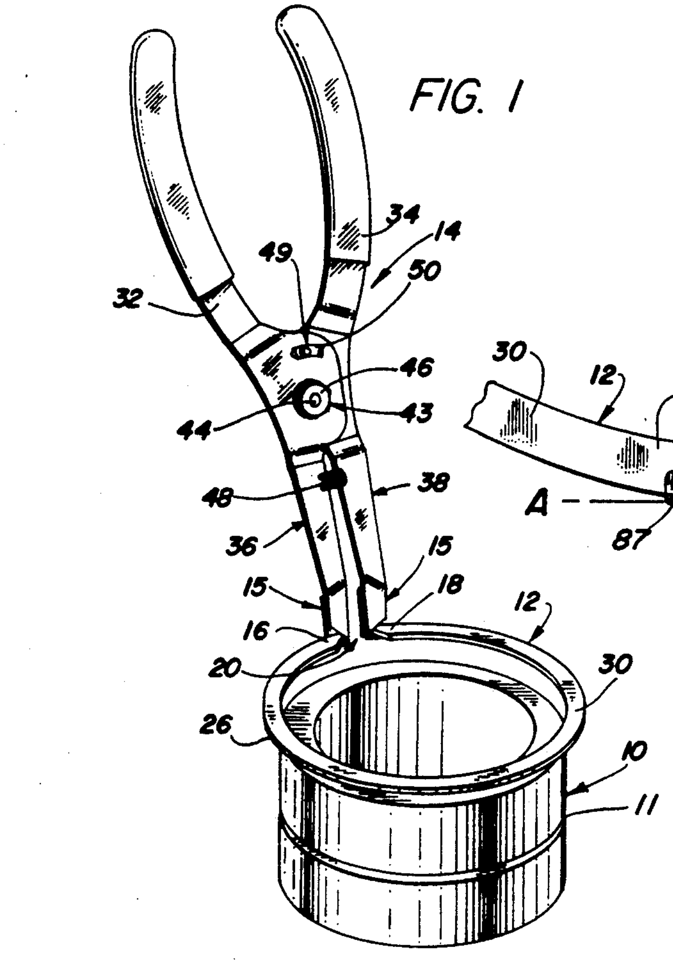
FIG. 1
FIG. 7
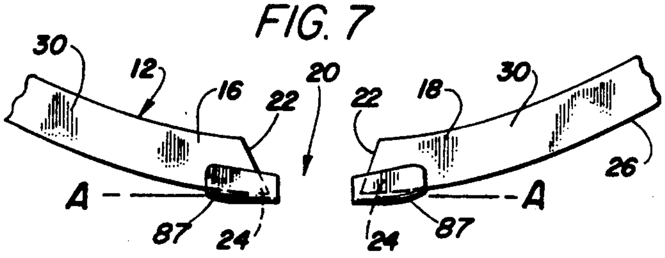
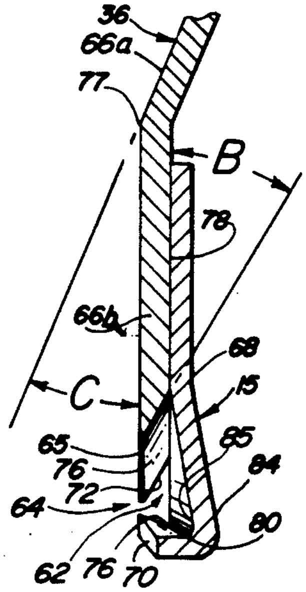
FIG. 8
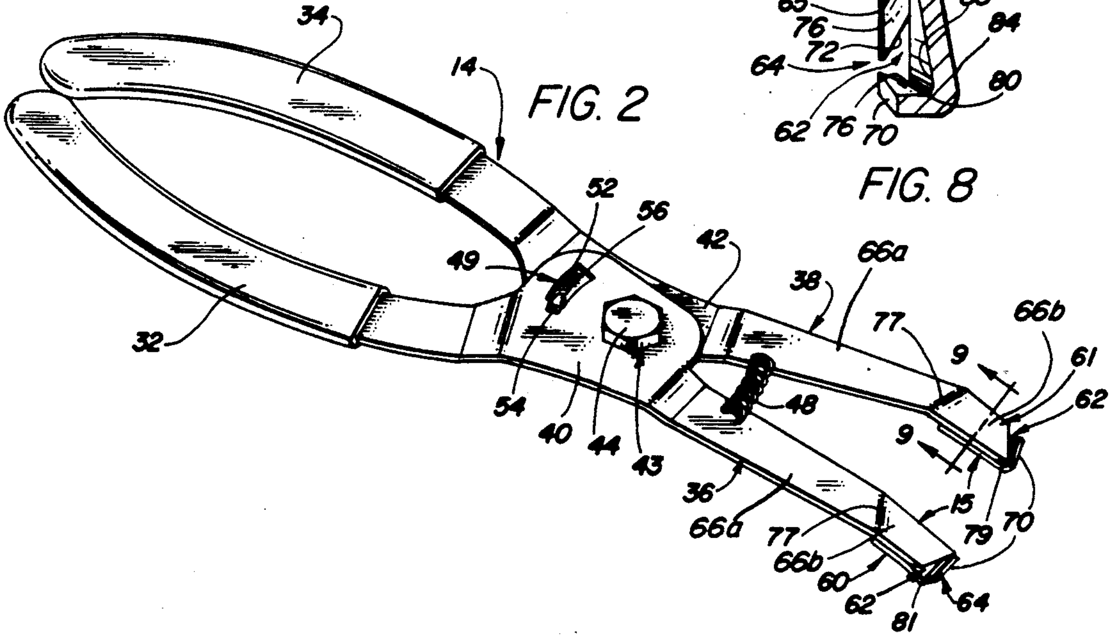
FIG. 2

REMOVAL TOOL FOR SNAP RINGS AND THE LIKE

BACKGROUND OF THE INVENTION

1. Field of the Invention

The present invention relates generally to a tool that is employed in the removal and installation of various types of snap ring members, and more particularly to pliers having a pair of forwardly extending jaw members, each free end of which is formed having a locking socket adapted to receive and retain the respective beveled ends of various types of snap rings, whereby the snap ring is secured to the tool in a place substantially perpendicular to the pliers.

2. Description of the Prior Art

It is well known that various problems and difficulties are being encountered in providing a suitable tool for removing and installing snap rings that are mounted within locations that are not easily accessible, such as when a snap ring needs to be removed from a part that is positioned within a housing.

Most known snap ring removal pliers, as found in the art, do not provide a locking means for automatically retaining the ring within the engaging ends of the pliers while the snap ring is being removed from the component part. That is, most snap ring removal tools or pliers are generally formed with engaging ends which do not provide a means to prevent the engaged ring from being inadvertently disengaged from the tool or prevent the snap ring from pivoting around the gripping points thus making installation difficult.

Accordingly, the following noted United States patents are examples of presently known snap ring removal tools that provide various mechanical arrangements unlike the novel operation and structure of the present invention.

In U.S. Pat. No. 1,264,304 to J. E. Keech, there is disclosed a piston-ring pliers having a ring engaging member but does not include a locking or holding device that will provide a positive retaining action for each of the free ends of the ring, nor is the pliers capable of engaging a snap ring in a position perpendicular to the plane of the ring.

U.S. Pat. No. 1,303,458 to J. Bretz, Jr., discloses a piston ring remover that has no spring action in either direction and is formed by two metal strips pivotally connected to each other, the four ends thereof being formed with ring engaging notches. This arrangement does not provide a structure that would allow for a positive locking engagement with the piston ring. Further, to remove the piston ring, this tool must be positioned for engagement in the same generally flat plane as the piston ring.

In U.S. Pat. No. 2,489,905 to F. Kuert, there is disclosed a cut ring expander tool which is defined by an expanding tongs and two gripping arms. Each gripping arm includes a gripping piece to hold one end of the ring and each is connected by two links to an arm of the expanding tongs. This, too, lacks side support members.

The following are additional disclosures of tools that are used in connection with removing various types of ring members, including piston rings.

U.S. Pat. No. 1,589,392 to W. F. Hiatt
U.S. Pat. No. 1,477,786 to V. C. Tillier
U.S. Pat. No. 1,477,677 to E. F. Westman
U.S. Pat. No. 1,475,665 to A. J. Wakefield
U.S. Pat. No. 1,157,082 to D. J. Campbell
U.S. Pat. No. 1,119,374 to S. W. Stirk
U.S. Pat. No. 1,071,934 to W. C. MacKinnon There is a need for a hand held tool such as pliers capable of readily removing and installing snap rings positioned in a plane substantially perpendicular to the gripping portion of the tool.

OBJECTS AND SUMMARY OF THE INVENTION

It is an important object of the present invention to provide a ring removal or install pliers or like tool that is especially adapted to remove snap rings, lock rings or retaining rings having pointed tip ends that project from mounting grooves of various types of secured components, wherein the pliers is comprised of a pair of elongated handles which are formed having extended jaw members. The handles of the pliers are pivotally connected intermediate their opposite ends. A biasing spring is positioned between the jaw members in front of the pivot point of the connected handles so as to bias the jaw members in a normally open position. The open position or spreading of the jaw members is limited by a slot-and-shoulder member which is located rearwardly of the pivot point of the pliers. The free end of each jaw member is formed having a positive locking socket which is defined by a convergent opening arranged to lockingly capture the respective free beveled ends of a snap ring.

Another object of the invention is to provide a ring removal pliers or like tool, wherein the convergent opening of the locking socket is so constructed as to receive and retain different diameters and thickness of retainer ring members.

A still further object of the present invention is to provide a tool of this character having a converging slotted socket adapted to receive various types and thicknesses of snap rings, wherein the range of accepted thickness of a ring member ranges from about 0.010" to 0.090".

It is a further object of the invention to provide a tool of this character that is constructed of relatively few operating parts, is relatively inexpensive to manufacture, and is simple yet rugged in construction.

A still further object of the invention is to provide a tool of this character that includes a biasing spring that urges the receiving tips of the tool apart so that the pliers will retain the ring without any pressure from the user's hand. The opposite is generally true of the prior art pliers which usually have springs that urge the tips of the tool in a closed position.

In accordance with the present invention, a ring removal tool is provided which includes a pair of oppositely disposed ring locking sockets that are formed at the proximate ends of the jaw members, the sockets being positioned and structured to lockingly engage the beveled free open ends of a ring member. The tool is preferably positioned substantially at right angles to the plane of the ring member so that the tool can be easily inserted within a housing or structure for attaching it to a ring member of a particular components such as, for example, when repairing a transmission. The locking socket is preferably defined by bending the proximate ends of the jaw members downwardly and inwardly of their plane so as to define a keeper member. The tip end of each of the keeper members may be angularly formed outwardly and beveled along the inner surface of the width thereof to define an undercut in which a portion of the ring is received and held in place. Fixedly mounted over each of the keeper members is an anvil member, the free end of which extends past the free end of the keeper member. The free end of the anvil is bent inwardly and twisted to define a retainer flange member which is angularly disposed outwardly and under the inwardly inclined tip end of the keeper member, whereby an inclined slotted socket is formed to lockingly receive the beveled end of the ring member for a positive engagement therewith.

The various features of novelty which characterize the invention are pointed out with particularity in the claims annexed to and forming a part of this disclosure. For a better understanding of the invention and its operating advantages by its use, reference should be had to the accompanying drawings and descriptive matter in which there are illustrated and described the preferred embodiments of the invention.

BRIEF DESCRIPTION OF THE DRAWINGS

Novel features and advantages of the present invention, in addition to those mentioned above, will become apparent to those skilled in the art from reading the following detailed description in conjunction with the accompanying drawings and numbered parts wherein:

FIG. 1 is a pictorial view illustrating the ring removal tool lockingly supporting a snap ring as it is removed from an annular groove formed in a component part;

FIG. 2 is a top perspective view of the ring removal tool showing the handle thereof in a retracted or closed position and the extended jaw members in a spaced apart or open position which is the normal position of the tool when not in use;

FIG. 7 is an end view of the retainer flange members of the socket showing the ring positioned in the socket when the jaw members are biased and spaced apart by the biasing spring that is mounted between the adjacent jaw members;

FIG. 8 is an enlarged cross-sectional view of the socket taken substantially along line 8—8 of FIG. 6.

DETAILED DESCRIPTION OF THE INVENTION

Figure 3:
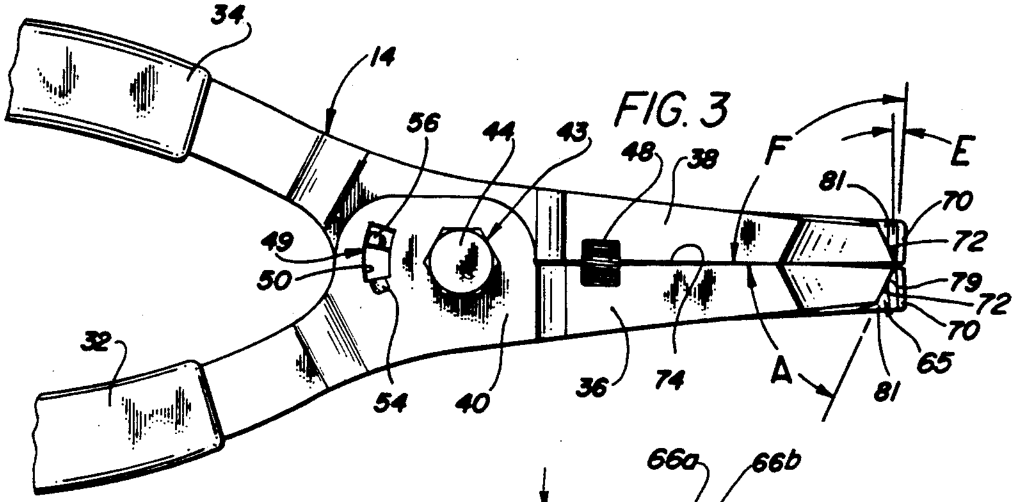
FIG. 3 is an enlarged top plan view of the tool showing the extended jaw members in a retracted or closed position, which is the approximate position used to secure a snap ring to the receiving socket members formed at the free ends of the jaw members.

Referring more particularly to FIG. 1, there is illustrated a component part 10 having an annular groove 11 formed therein in which is normally mounted a snap ring, generally indicated at 12. The present invention, generally indicated at 14, is shown as being a pliers like tool having snap ring 12 attached to the uniquely arranged mounting tips 15 which are formed to receive various types of securing ring members, such as lock rings or retainer rings. Thus, for simplicity, the term "snap ring" will be hereinafter employed to define all types of the above-noted ring members that can be formed having different sizes of diameters as well as thicknesses. These snap rings are commonly formed having oppositely spaced apart, beveled, open end portions or members 16 and 18 which define an opening 20 therebetween. Each beveled open end member is formed having an inwardly inclined free edge 22 so as to establish an extended pointed tip 24 (FIG. 7) on each of the end members 16 and 18. These pointed tips are formed at the junction of the outer annular edge 26 of snap ring 12 and the converging inclined free edge 22. Snap rings are commonly formed having flat bodies 30 of various widths and thicknesses that provide flat horizontal planes.

It is often necessary to remove a component part, such as 10, that is secured within a surrounding housing (not shown). A snap ring that is mounted to a component part within restricted space requires a tool that is capable of being attached to the snap ring from a position perpendicular to the horizontal plane of the snap ring. Accordingly, from the following description it will be understood that the present invention is uniquely arranged to capture a snap ring, such as 12, and remove the ring from a component part that is mounted in a housing or structure without the need to totally dismantle the entire housing or structure as may be required when using tools of the prior art.

Figure 4:
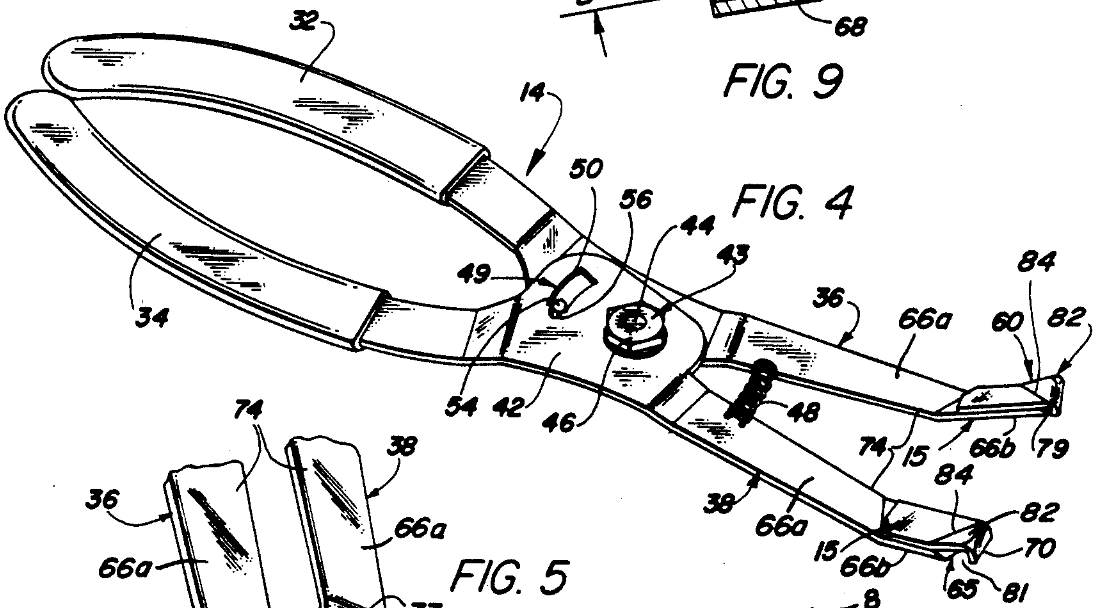
FIG. 4 is a perspective view of the bottom side of the tool which is shown in an open position similar to that shown in FIG. 2.

Accordingly, pliers 14 comprises a pair of elongated handles, wherein one is designated as a first handle member 32 and the other is designated as a second handle member 34. The handle members are formed having an extended jaw members 36 and 38, respectively as shown. Both handle members 32 and 34 are further formed having intermediate pivot plates 40 and 42, respectively, and are provided with aligned holes to receive a suitable pivot means, generally designated at 43, which is defined by bolt 44 and nut 46. See FIG. 2. Jaw members 36 and 38 extend outwardly from their respective pivot plates 40 and 42. As seen in FIG. 2, pivot plate 40 of first handle member 32 is mounted over pivot plate 42 of second handle member 34, thus allowing both handle members to pivot about bolt 44 so that the pliers can be opened or closed as needed. However, there is provided a biasing spring 48 that is positioned forward of pivot means 43 and is connected to and interposed between the two jaw members so as to bias the jaw members to an open position, as illustrated in FIGS. 1, 2, and 4.

Also formed on pivot plates 40 and 42, is a means, indicated at 49, for limiting the movement of the jaw members. Limiting means 49 is defined by a pair of aligned arcuate slots 50 and 52 that are formed in respective mounting plates 40 and 42 and are positioned rearwardly of pivot means 43. Each slot is formed having respective shoulder stop members 54 and 56 which are arranged to be positioned in the respective adjacent slot. When the pliers are in a fully open position the two shoulder stop members will engage each other, thereby limiting the open position, as illustrated in FIGS. 2 and 4.

A pair of oppositely disposed ring locking means, generally indicated at 60 and 61, are formed at the ends 15 of respective jaw members 36 and 38, each locking means being arranged to lockingly engage and capture the respective oppositely spaced apart, beveled, open end members 16 and 18, as illustrated in FIGS. 1, 2, 5, 6 and 7. It is important to note that when pliers 14 is attached to the snap ring the locking portions thereof are positioned substantially at right angles to the flat plane of snap ring 12. (See FIGS. 1, 5, and 6) This arrangement allows pliers 14 to be readily inserted within a housing (not shown) for attaching to a snap ring that is to be removed from or for releasing a snap ring to be mounted to a component part disposed within the housing.

Locking means 60 and 61 are each provided with a locking socket 62 having a convergent opening 64 which is arranged to receive the respective free beveled ends 16 and 18 of snap ring 12. See FIG. 8. The extended jaw members 36 and 38 include an upper portion **66*a* and a lower portion 66*b* which forms a tip end member. Each locking socket is defined by a dual or compound beveled edge formed on the lower portion 66*b* that defines tip end member 65 of each jaw member 36 and 38, and a generally L-shaped flanged arm or anvil member 68 which is fixedly attached to one side of lower portion 66*b*** of the extended jaw member.

The lower portion of the flanged arm member 68 forms a lip member 70 lying in a plane that intersects the plane of the lower portion **66*b* of the respective jaw member at about a right angle as illustrated. The lip member 70 is positioned under and adjacent to the tip end member 65 which defines a compound or dual beveled edge. Together, the dual beveled edge of tip end member 65 and the inner surfaces of the lower portion of the flanged arm member 68 including lip member 70 define a convergent opening 64. The dual beveled edge is formed having a first edge and a second edge. The first edge is defined by bottom outer edge 72 that extends inwardly toward the handles (32, 34) from the inner edge 74 of each respective jaw member, as is illustrated in FIG. 3 at "A", the preferred angle being about 65 degrees to the inner edge 74. The second edge is defined by an inner beveled edge 76 that is formed at an angle between about 25 to 35 degrees, the preferred angle being about 30 degrees to the inner wall 78 of lower portion 66*b*, as is illustrated in FIG. 8** and designated at "B".

The lower portion **66*b* of each jaw member is bent downwardly at 77 with respect to the outer surface of the upper portion 66*a*** of the respective jaw member at an angle "C" within the range of about 0 to 90 degrees. Preferably the angle C is within the range of about 10 to 25 degrees so that the handles are positioned substantially at right angles to the plane of the snap ring. In some applications of the tool, no bend is needed in forming the extended jaw members.

Figure 9:
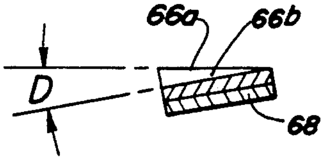
FIG. 9 is an enlarged cross-sectional view taken substantially along line 9—9 of FIG. 2.

The lower portion **66*b* of each jaw member 36 and 38 is also preferably twisted inwardly with respect to the outer surface of the upper portion 66*a* of the respective jaw member so that the free end portion extends upwardly from inner edge 74 at an angle "D" of about 15 degrees (+/− 10 degrees) as is illustrated in FIG. 9**. This upward twist keeps the locking sockets aligned with the ends of the snap ring to be captured or released and also allows the tool to be inserted inside of annular housings of small diameters relative to the size of the tool.

Figure 5:
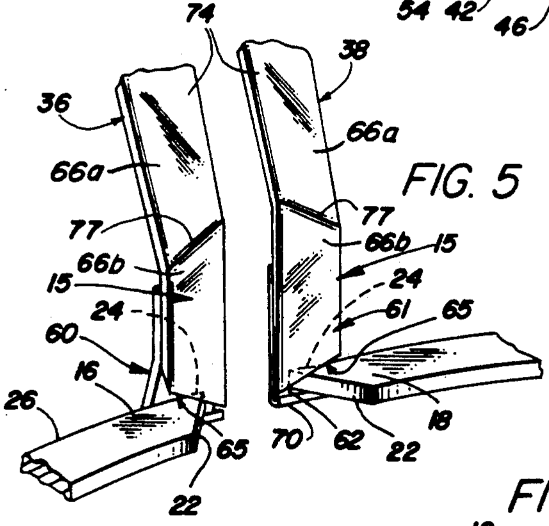
FIG. 5 is an enlarged pictorial view of the front of the socket member formed on the respective juxtaposed jaw members, wherein the open beveled ends of a snap ring are shown being secured within the slotted socket.

Lip member 70 extends downwardly from the inner edge to the outer edge thereof at a suitable angle of between about 0 to 10 degrees, the preferred angle being approximately 5 degrees, as indicated at "E" in FIG. 3. The angle of lip member 70 with respect to that of inner edge 74 of the jaw members is indicated at angle "F" in FIG. 3, and is preferably set at about 95 degrees plus or minus about 1 or 2 degrees. The angular displacement between each flange lip member 70 allows free ends 16 and 18 of snap ring 12 to be readily received in the respective convergent openings 64 of sockets 62 when jaw members 36 and 38 are brought together, as illustrated in FIG. 3. Once the pliers is released, the jaws are forced outwardly, thus locking the tip ends 24 in the respective sockets, i.e., between the inner surfaces of each flanged arm 68 including lip member 70 and the first and second edges 74 and 76 of the tip end 65 as is illustrated in FIG. 5. At this time, the flange lip members are attached to the snap ring in a tangential plane, indicated by plane A—A. This permits free ends 16 and 18 of the snap ring 12 to be moved so as to expand the related opening 20 without causing excessive bowing of the captured ring.

Figure 6:
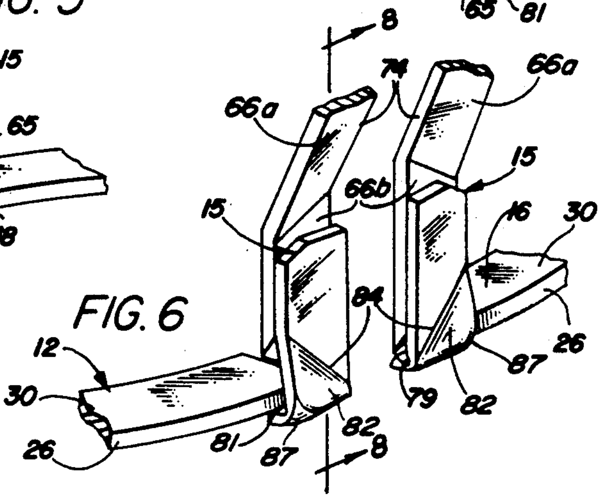
FIG. 6 is an enlarged pictorial view of the rear of the socket member showing the configuration of the anvil member fixedly secured to the proximate end of the jaw members, the snap ring being shown in a locked position within the slotted socket.

Flange lip member 70 may be further formed having a tapered channel 80 as viewed in FIG. 8, the inner portion 79 of channel 80 being smaller than the enlarged outer portion or mouth receiving end 81. In order to form the tapered channel 80 and to provide the socket with an enlarged mouth end, the free end 82 of flange arm 68 is preferably bent angularly and outwardly along line 84 (e.g. at an angle comparable to D) to form the enlarged mouth receiving end 81 so as to readily receive pointed end 24 of each beveled end 16 and 18 of ring 12, as is illustrated in FIGS. 5 and 6. The bend of free end 82 along line 84 results in the inner edges 85 of the lower portion of the flanged arm members adjacent the 90 degree bend which forms the lip member 70 (FIG. 8) being aligned along a straight line such as that illustrated by line A—A in FIG. 7. These inner edges 85 are aligned in a plane occupied by a snap ring when captured in the sockets. The outer corners 87 of the lower portions of the flanged arm members 68 are preferably relieved about the thickness of the member (e.g., 0.062") to enable the pliers to be operated in a small area such as a housing having an inside diameter of less then 1½". Flange lip member 70 may be undercut at the closed end as is illustrated in FIG. 8 to enhance the gripping action for small diameter rings. For better support of large diameter rings, the flange lip member may be flat.

The above described angles "A" through "F" aid in providing a positive locking arrangement between the locking socket 62 and the various sizes and thicknesses of the many types of snap rings and in allowing the tool to insert or remove snap rings in confined work areas. When jaws 36 and 38 are positioned to be received into space 20 for engagement with the beveled ends 16 and 18 of snap ring 12, spring 48 will force the jaws to spread apart when released and capture the ends in the respective locking means 60 and 61, thereby preventing the snap ring from being inadvertently released or removed from pliers 14. To either insert or remove snap ring 12, the user of the tool needs only to apply a small amount of force to handles 32 and 34, whereby the diameter of the snap ring is enlarged to pass over component 10, such as illustrated in FIG. 1.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A pliers for installing or removing a snap ring having beveled open end portions terminating in opposed pointed tips comprising:

a pair of handles pivotally connected to each other;

a pair of jaw members integrally formed with said handles and extending outwardly therefrom, wherein each jaw member is formed having a disposed free end;

a pivot means positioned intermediate said handles and said jaw members whereby inward movement of the handles causes the jaw members to move outwardly to an open position and outward movement of the handles causes the jaw members to move inwardly to a closed position;

a positive engaging socket member carried on each of said free ends of the jaw members, each of said socket members having an open convergent socket which converges in the direction of inward jaw movement, each of the convergent sockets being constructed and arranged to receive and extends over a respective pointed tip of a snap ring for locking said tip within the convergent sockets and preventing inadvertent disengagement of the snap ring from the pliers when the jaw members are moved outwardly to separate the open end portions of the snap ring; and a biasing means for biasing said jaw members in a normally open position so as to forcibly engage each of said socket members with the respective open end portions and tip ends of the snap ring, thereby preventing the snap ring from accidentally disengaging from said convergent sockets.

2. A pliers as recited in claim 1, wherein each of said jaw members defines an upper portion and a lower portion which carries the engaging socket member each of the two lower portions being inclined at an angle "C" of between 0 to 90 degrees with respect to the upper portion of the respective jaw member when the upper portions are positioned generally horizontally so that at an angle "C" of 90 degrees a snap ring secured in the pliers extends away from the handles.

3. A pliers as recited in claim 2, wherein each of said engaging socket members comprises a tip member with at least a first beveled free edge and a lower flanged arm member fixedly attached to one side of said tip member, the flanged arm member including a lip member extending under and adjacent said first beveled free edge of said tip member, the distance between the first beveled free edge and the lip member decreasing in the direction of inward jaw movement, whereby the convergent socket is defined therebetween.

4. A pliers as recited in claim 3, wherein said tip member is formed having a compound beveled edge and an inner wall facing the flanged arm member and wherein the first beveled edge is formed to define a first bottom inclined edge of said tip member and a second beveled edge is formed to define an inner beveled edge formed along the inner wall of said first beveled edge.

5. A pliers as recited in claim 4, wherein said lip member extends downwardly away from the handles with respect to said tip member in the direction of outward jaw movement and wherein said flanged arm member is inclined outwardly of and away from said first bottom inclined edge of said tip member, in the direction of outward jaw movement whereby said convergent socket is defined.

6. A pliers as recited in claim 5, wherein said flanged arm member and said tip member define a tapered channel.

7. A pliers as recited in claim 5, wherein said convergent socket is formed having a reduced inner opening and an enlarged outer opening facing in the direction of outward jaw movement, whereby the open free ends of the snap ring make positive engagement within said respective socket members.

8. A pliers as recited in claim 7, wherein said each jaw member has an inner edge which is positioned adjacent the other jaw member in the closed position and wherein said flanged arm member is generally L-shaped, the lip member thereof extending downwardly from said inner opening to said outer opening of said convergent socket at an approximate angle "E" of between about 1 to 10 degrees with respect to a line drawn perpendicular to the inner edge of said respective jaw member.

9. A pliers as recited in claim 3, wherein each jaw member defines an inner edge which is positioned adjacent the other jaw member in the closed position, wherein the lower portion of each jaw member defines an inner wall to which the flanged arm is attached and wherein said tip member is formed having said first beveled edge and a second beveled edge, wherein said first beveled edge is defined by a bottom inclined edge extending inwardly toward the handles in the direction of outward jaw movement at an approximate angle "A" of between about 55 to 75 degrees to the inner edge of said respective jaw member, and wherein said second beveled edge is defined by an inner beveled edge facing the flanging arm member and having an angle "B" of between about 25 to 35 degrees with respect to the inner wall of said lower portion of the respective jaw member.

10. A pliers as recited in claim 9, wherein said angle "A" is about 65 degrees, and wherein angle "B" is about 30 degrees.

11. A pliers as recited in claim 2, wherein the snap ring is flat and generally positioned in a plane and wherein the angle "C" is within the range of about 0 to 25 degrees, the lower portions of the jaw members carrying the engaging socket members being substantially at right angles to the plane of a snap ring secured in the socket members.

12. A pliers as recited in claim 11 wherein the angle "C" is within the range of about 15 to 25 degrees.

13. A pliers as recited in claim 9, wherein said lower portion of each jaw member is twisted inwardly with respect to the upper portion of the respective jaw member so that when the upper portions of the jaw members are positioned horizontally each lower portion extends upwardly from the inner edge of the respective jaw member in the direction of outward jaw movement, at a preferred angle "D" within the range of about 5 to 25 degrees.

14. A pliers as recited in claim 13 wherein said flanged arm member defines an inner edge of the respective socket adjacent said lip member and wherein the flanged arm member is bent outwardly away from said tip member from said inner opening of said convergent socket at an approximate angle equal to the angle D so that said inner edges of the sockets formed by the flanged arm members in the plane occupied by a snap ring when captured by the pliers are aligned along a substantially straight line.

15. A pliers as recited in claim 14 wherein each flanged arm member is L-shaped and defines an outer corner at the enlarged outer opening of the convergent socket and wherein each of said outer corners is relieved about the thickness of the flange material to aid in reducing the size of opening within which the pliers may be operated.

16. A pliers as recited in claim 14 wherein the angles "A", "B", "C" and "D" are about 65 degrees, 30 degrees, 15–25 degrees and 15 degrees, respectively.

17. The pliers as recited in claim 16 further including means for limiting the movement of said handles and said jaw members, said limiting means being positioned rearwardly of said pivot means.

18. A snap ring removal tool for engaging the open end members of a flat generally planar snap ring having beveled open end portions terminating in opposed pointed tips comprising:

a pair of handles pivotally connected to each other so that inward movement of the handles causes the jaw members to move outwardly and visa versa, an extended jaw member and a pivot plate formed integrally with each of said handles, the extended jaw member having a free end positioned outwardly of the handles, the pivot plate being interposed between said handle and said jaw member;

a socket member formed on each free end of said jaw members, each of said socket members having a socket converging in the direction of inward jaw movement and constructed and arranged to extend over a respective pointed tip of a snap ring to lockingly receive said tips within the convergent sockets and prevent the inadvertant disengagement of the snap ring from the pliers when the socket members are moved outwardly to separate the open end portions of the snap ring;

a biasing spring interposed between said jaw members and positioned forwardly of said pivot for biasing said jaw members in an open position so as to forcibly engage each of said socket members with the respective pointed tip of the snap ring, whereby the open end portions of the snap ring are captured within the convergent sockets of said socket member, thereby preventing the snap ring from being released accidentally from the pliers; and means for limiting the movement of said handles and said jaw members, said limiting means being positioned rearwardly of said pivoting means and formed in said pivot plates.

19. A snap ring removal tool as recited in claim 18, wherein each of said sockets is formed from a planar tip end member and a flanged arm member, the tip end member having a dual beveled free edge comprising a first bottom edge extending inwardly in the plane of the tip end member toward the handles in the direction of outward jaw movement and a second inner edge extending inwardly toward the handles from the first edge and intersecting the plane of the tip end member at an acute angle "B", the flanged arm member being fixedly attached to the tip member adjacent the second beveled edge thereof, said flanged arm member including a flanged lip positioned adjacent to and under the first beveled edge and divergent thereto in the direction of outward jaw movement, the convergent socket being defined between the first and second edges of the tip member and the flanged arm member and having an open receiving end facing in the direction of outward jaw movement and a terminating end facing in the direction of inward jaw movement, whereby the open end portions of the snap ring are received and locked within the respective convergent sockets by means of the spreading force applied by the biasing spring.

20. A snap ring removal tool as recited in claim 19, wherein each jaw member has an inner edge which is positioned adjacent the inner edge of the other jaw member in the closed position and wherein said flanged lip is inclined downwardly with respect to the handles from said terminating end to said open receiving end of said convergent socket at an angle "E" of between about 0 to 10 degrees with respect to a line drawn perpendicular to the inner edge of the respective jaw member.

21. A snap ring removal tool as recited in claim 19, wherein said first beveled edge is at an angle "A" of between about 55 to 75 degrees to said inner edge of the respective jaw member, and wherein said angle "B" of said second beveled surface is between about 20 to 35 degrees.

22. A snap ring removal tool as recited in claim 21, wherein each of said free ends of the jaw members comprises an upper portion and a lower portion in which the socket member is formed, each lower portion extending at an approximate angle "C" of between 0 to 90 degrees with respect to the upper portion of the upper portion of the respective jaw member so that at an angle "C" of 90 degrees, a snap ring secured in the pliers extends away from the handles.

23. A snap ring removal tool as recited in claim 22, wherein the angle "C" is within the range of about 15 to 25 degrees.

24. A pliers as recited in claim 23, wherein the lower portion of each said jaw member is twisted inwardly with respect to the upper portion thereof so that when the upper portion is positioned horizontally the lower portion extends upwardly from the inner edge of the respective jaw member in the direction of outward jaw movement, at a preferred angle "D" within the range of about 5 to 25 degrees.

25. A pliers as recited in claim 24 wherein the angles "A", "B", "C" and "D" are about 65 degrees, 30 degrees, 15–25 degrees and 15 degrees, respectively.

26. A snap ring removal tool as recited in claim 25, wherein said flange lip of said flanged arm member defines an inner tapered channel with an increased opening in the direction of outward jaw movement.

27. A snap ring removal tool for lockingly engaging a planar snap ring having beveled open free ends comprising:

a pair of handles pivotally connected to each other, wherein each of said handles includes an extended jaw member having a free end member positioned outwardly of the handles, and a pivot plate interposed between said handle and said jaw member whereby movement of the handles in one direction causes the jaw members to move outwardly to an open position and movement of the handles in the opposite direction causes the jaw members to move to a closed position;

a socket member formed on each of said free end members of said jaw members, each of said socket members having a convergent socket converging in the direction of inward jaw movement and being arranged to receive and extend around the respective beveled open free end of a snap ring when the jaw members are moved outwardly to force the open ends of a snap ring apart to thereby prevent the beveled open free ends from moving out of the socket;

a pivot means positioned intermediate said handles and said jaw members and mounted in said pivot plates; and means for limiting the movement of said handles and said jaw members.

28. A snap ring removal tool as recited in claim 27, wherein each of said jaw members has an inner edge, an upper portion and lower portion, the lower portion lying in a plane and wherein each of said socket members is formed from a tip member on said lower portion having a dual beveled edge and an anvil member attached to said lower portion, the dual beveled edge comprising a first beveled edge and a second beveled edge, wherein said first beveled edge is inclined inwardly toward the handles commencing at the inner edge of the respective jaw member at an angle "A" of between about 55 to 75 degrees to said inner edge, and wherein said second beveled edge is inclined inwardly toward the handles and adjacent the anvil member from said first beveled edge at an angle "B" of between about 20 to 35 degrees relative to the plane of said lower portion.

29. A snap ring removal tool as recited in claim 28, wherein each of said lower portions is formed at an approximate angle "C" of between 0 to 15 degrees with respect to the respective upper portion of said jaw member.

30. A snap ring removal tool as recited in claim 27, wherein said tip end of each said jaw member is twisted with respect to the upper portion of said jaw member so that the free end portion extends upwardly from the inner edge of the respective jaw member, at a preferred angle "D" within the range of about 5 to 25 degrees.

* * * * *

UNITED STATES PATENT AND TRADEMARK OFFICE
CERTIFICATE OF CORRECTION

PATENT NO. : 5,212,859

DATED : May 25, 1993

INVENTOR(S) : William K. Hagerty

It is certified that error appears in the above-identified patent and that said Letters Patent is hereby corrected as shown below:

Column 7, line 25, "extends" should read --extend--.

Column 8, line 36, "flanging" should read --flanged--.

Signed and Sealed this

Twenty-fifth Day of January, 1994

Attest:

BRUCE LEHMAN

Attesting Officer

*Commissioner of Patents and Trademarks*